(12) United States Patent
Ghannam et al.

(10) Patent No.: US 12,103,355 B2
(45) Date of Patent: Oct. 1, 2024

(54) ADAPTIVE INTEGRATED VEHICLE WIRE AND SIGNAL TRANSPORT SYSTEM

(71) Applicant: FORD GLOBAL TECHNOLOGIES, LLC, Dearborn, MI (US)

(72) Inventors: Mahmoud Yousef Ghannam, Canton, MI (US); Jonathan Engels, Tecumseh, MI (US); Galen Keith Thomas, Dearborn, MI (US); Haysam M. Kadry, Dearborn Heights, MI (US); James Martin Lawlis, Grosse Pointe Farms, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 198 days.

(21) Appl. No.: 17/717,466

(22) Filed: Apr. 11, 2022

(65) Prior Publication Data

US 2023/0322042 A1 Oct. 12, 2023

(51) Int. Cl.
*H05K 1/02* (2006.01)
*B60H 1/00* (2006.01)
*B60R 16/023* (2006.01)
*B60R 16/03* (2006.01)
*G09G 3/06* (2006.01)
*G09G 3/3233* (2016.01)
*H04N 17/00* (2006.01)
*H04N 25/70* (2023.01)
*H05K 3/08* (2006.01)

(52) U.S. Cl.
CPC ..... *B60H 1/00642* (2013.01); *B60R 16/0231* (2013.01); *B60R 16/03* (2013.01)

(58) Field of Classification Search
CPC ...... H05K 1/02; H05K 1/0296; H05K 3/0008; H05K 3/4638; H05K 3/4641; B60H 1/00564; B60H 1/00642; B60R 16/0231; B60R 16/03; G01N 33/0009; G01R 1/0416; G01R 1/0408; G01R 1/075; G09G 3/006; G09G 3/3233; H04N 17/00; H04N 25/70
USPC ............... 361/772; 324/537, 750.25, 756.02, 324/756.04, 756.05, 756.07, 756.1; 73/23, 34
See application file for complete search history.

(56) References Cited

U.S. PATENT DOCUMENTS 5,735,041 A 4/1998 Zaguskin et al.
9,340,166 B2 5/2016 Vanhouten et al.

FOREIGN PATENT DOCUMENTS

DE 10233168 B4 8/2008
DE 102012104569 B4 3/2021

*Primary Examiner* — Xiaoliang Chen
(74) *Attorney, Agent, or Firm* — Frank Lollo; Brooks Kushman P.C.

(57) ABSTRACT

A vehicle panel includes channels, wherein a first channel includes a first wire capable and a second channel includes a second wire and each wire is capable of carrying at least one of power or a vehicle data signal. The panel also includes a connection point connectable to at least one of a battery or a vehicle computing system, wherein selection of connection between the vehicle computing system or battery to a given connection point provided to a given one of the first or second channels dictates whether the channel carries the vehicle data signal or power. Also, the panel includes holes connecting to the first wire and at least two of the holes connecting to the second wire allowing a connection probe to be inserted into a respective hole to connect to a wire included in a channel to which the hole connects.

13 Claims, 3 Drawing Sheets

ADAPTIVE INTEGRATED VEHICLE WIRE AND SIGNAL TRANSPORT SYSTEM

TECHNICAL FIELD

The illustrative embodiments generally relate to an adaptive integrated vehicle wire and signal transport system.

BACKGROUND

Wire harnesses route wiring throughout a vehicle to supply electronic modules/sensors with power and signals. As vehicles add more electronic features, more wiring is needed to support the features. Adding more wiring/circuits to the vehicle directly increases size of the wire harnesses as well as the cost and mass. Complex vehicles can have more than two thousand wires totaling over three miles in length, and this number can even increase as more electronic control units (ECUs) are added to the vehicle. With increasing functions and features, it is increasingly difficult to find space in the vehicle to package the wire harnesses.

Ideally, wiring is routed in in the shortest path between modules. Due to the volume of brackets, welds, and uneven surfaces of a vehicle floor, wire harnesses are usually only routed down the sides of the vehicle, not across the center of the floor. Also, wire bundles in the middle of the floor would cause an uneven floor and could present an obstruction to the vehicle occupant. This design increases the wire length since the shortest path is not always possible to route wire. Increased wire length also increases the mass and cost of the wire harness.

Finally, wire harnesses are not easily configurable. Many part numbers/variations are required to support all the different options a vehicle has. And once a vehicle is assembled, it can be difficult to change or modify the harnesses. This limits the post-assembly features available for retrofit onto a vehicle.

SUMMARY

In a first illustrative embodiment, a vehicle panel includes a plurality of channels, running within the panel, wherein a first of the plurality of channels includes a first wire capable of carrying at least one of power or a vehicle data signal and a second of the plurality of channels includes a second wire capable of carrying at least one of power or a vehicle data signal. The panel also includes a connection point, provided to at least each of the first and second channels, the connection point connectable to at least one of a battery or a vehicle computing system, and wherein selection of connection between the vehicle computing system or battery to a given connection point provided to a given one of the first or second channels dictates whether the channel carries the vehicle data signal or power. Also, the panel includes a plurality of holes provided through a common plane of the panel, at least two of the holes connecting to the first wire and at least two of the holes connecting to the second wire allowing a connection probe or connector to be inserted into a respective hole to connect to a respective wire to which the respective hole connects.

In a second illustrative embodiment, a vehicle panel includes a plurality of channels, provided to the panel, wherein a first of the plurality of channels includes a first wire capable of carrying at least one of power or a vehicle data signal and a second of the plurality of channels includes a second wire capable of carrying at least one of power or a vehicle data signal. At least the first of the plurality of channels runs along a longitudinal axis of the panel and at least one of the second of the plurality of channels runs along a lateral axis of the panel substantially perpendicular to the longitudinal axis, and the panel includes a connection point, provided to at least each of the first and second channels, the connection point connectable to at least one of a battery or a vehicle computing system, and wherein selection of connection between the vehicle computing system or battery to a given connection point provided to a given one of the first or second channels dictates whether the channel carries the vehicle data signal or power. The panel also includes a plurality of holes provided through a common plane of the panel, at least two of the holes connecting to the first wire and at least two of the holes connecting to the second wire allowing a connection probe to be inserted into a respective hole to connect to a respective wire to which the respective hole connects.

In a third illustrative embodiment, a vehicle panel includes a plurality of channels, running within the panel, wherein a first of the plurality of channels includes a first wire capable of carrying at least one of power or a vehicle data signal, a second of the plurality of channels includes a second wire capable of carrying at least one of power or a vehicle data signal and a third of the plurality of channels including hollow tubing connected at a first point to a vehicle heating, ventilation and air-conditioning system (HVAC) blower output and connected at a second point to a vehicle distribution vent for distribution of airflow generated by the blower output. The panel also includes a connection point, provided to at least each of the first and second channels, the connection point connectable to at least one of a battery or a vehicle computing system, and wherein selection of connection between the vehicle computing system or battery to a given connection point provided to a given one of the first or second channels dictates whether the channel carries the vehicle data signal or power. Further, the panel includes a plurality of holes provided through a common plane of the panel, at least two of the holes connecting to the first wire and at least two of the holes connecting to the second wire allowing a connection probe to be inserted into a respective hole to connect to a respective wire to which the respective hole connects.

DETAILED DESCRIPTION

Figure 1:
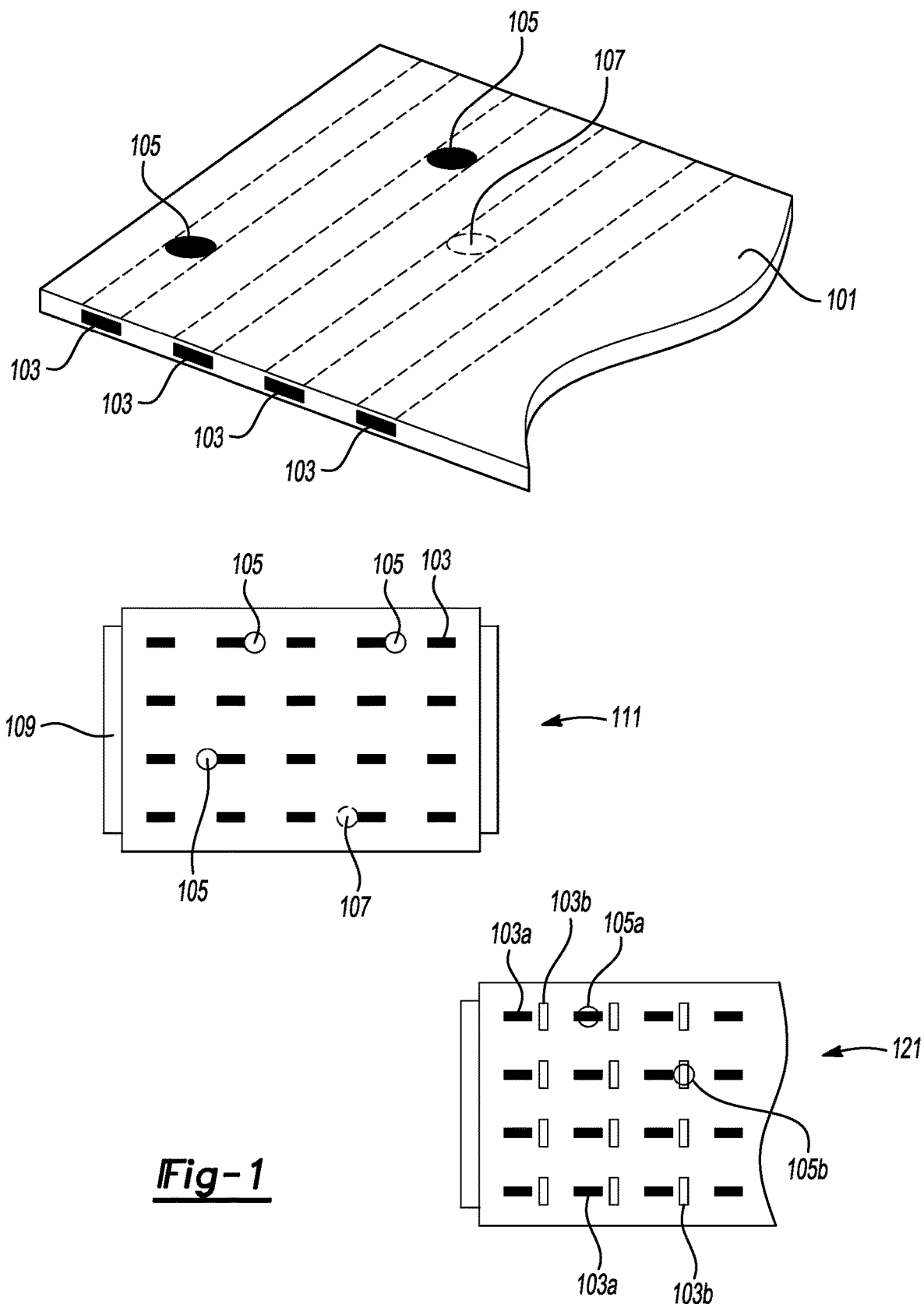
FIG. 1 shows various configurations of illustrative panels with channeling.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In each of the illustrative embodiments discussed herein, an exemplary, non-limiting example is shown. Other configurations and layouts according to the embodiments and under guidance of the embodiments are similarly possible and are contemplatable by a skilled artisan utilizing this disclosure, and thus are considered to be within the scope of contemplation.

The illustrative embodiments propose an adaptive configuration of a vehicle body element, such as, but not limited to, a floor panel, wherein strategically placed channels within the body element serve varied purposes as needed. Channeling can be used for including wiring, as in a breadboard, wherein a given channel's wiring can serve a purpose based on what signal(s) (or power supply) is directed to the wiring in a given channel. Various modular elements can be connected to the channel's wiring via a probe, which allows for wiring in the channel to serve to distribute its signal to a variety of connected elements that can be swapped, removed or added (via connections to the channel) as needed. Signals to the whole group of ECUs (or other elements) connected to a given channel can be supplied to the given channel and thus all the connected ECUs. Redundant critical signal feeds can be added or subtracted due to the parallel nature of the design. ECU probes can be moved to parallel runs if a given run can no longer be used.

Channeling within the panel can serve other purposes as well, delivering signals via sound passed through the channels when the channels are open, and/or serving as HVAC distribution channels when the channels are open and not otherwise utilized.

Illustrative embodiments with wiring in the channels will be herein referred to as "additive" solutions, and illustrative embodiments without elements installed in the channels will be referred to as "subtractive" solutions, although it is appreciated that the channels can be configured to serve either function as needed.

Panels for installation can include, but are not limited to, floor panels (underbody and/or carpet panels), skateboard panels (FMP), roof/headliner panels, door trim panels, instrument trim panels, cross car beams, seats, fuel tank, liftgate, battery cover (in a BEV), etc. Signals can be delivered from one panel to a corresponding run in another panel by a connecting probe, so adjacent or even somewhat co-located panels can achieve the effect of signal extension with limited wiring. Since channels can remain sealed until needed, through the provision of cut-outs or punch-outs for a given channel in a given panel, a number of panels can be provided with additive and subtractive channels as desired, and the channels (and any purpose they may be intended to serve) can be accessed as needed to allow for aftermarket upgrades and refit of ECUs if a given can no longer be used or is unavailable. Panels may have channels provided thereto, which can include channels fabricated within a panel or affixed to or adjacent a panel. A channel within a panel can include channels along a plane of a panel achieved through affixation of the channel to an outer surface of the panel, through, for example, but not limited to, fusing the channel to panel.

FIG. 1 shows an example of single-direction channeling in a generic panel 101. These channels 103 can be used for additive or subtractive purposes, and for additive purposes wiring can be provided as needed. The channels 103 can run in parallel along the panel 101, and designated access points 105 can be punched for insertion of probes (or exit points for subtractive channels) as needed for a given body configuration or make and model. For example, a vehicle may have an option to include one or more rear electronic controls in a certain model or trim level, and the panel may include the necessary additive wiring channels to support these controls. In option packages that include the controls, the controls can be powered and transmit signals through probes inserted into the appropriate channel connection points 105. When the controls are not included, the same panel could be provided if desired, but the connection points 105 could be left unopened. Punchout designators 107 could be included in the panel (e.g., under the carpet for a body panel) and the vehicle could be retrofit with the desired alternative controls or other electronics without having to run a new wire harness back to the connection location for the controls.

For thin panels, e.g., sheet metal floors or side panels, there are often additional gages required to meet mechanical requirements for durability, vibration mitigation, loading, etc. To avoid increasing thickness, engineers may often add ribs, beads, slabs, etc. to these panels to improve the material qualities of the panel. By distributing wire material through these vehicle parts, a component with a non-homogeneous structure is formed, and with many wires, an effect similar to that achieved by rebar in concrete can be achieved. The wires may effectively play the roles of ribs and beads within a panel because they follow the contours and thicknesses of the panel, and the wires can thus provide stability to the part. This can provide adequate incentive in certain instances to include the wires even when not needed for a given model, which ultimately provides the increased mechanical stability in addition to allowing the model to be retrofit or upgraded aftermarket without the hassle and expense of new wiring harnesses.

Intersections of wires can be isolated and separated as needed, to avoid cross contact, and the panel can thus act as a breadboard to allow connections from different positions, cross-channel connection and paths. Runs can be single directional (e.g. lateral or longitudinal), and FIG. 1 also shows an example of a longitudinal run 111. The run has pre-drilled holes 105 where certain connections are necessary or anticipated and these holes 105 can provide access to the circuit through insertion of probes/pins. The probe may have a wire extending therefrom that can be connected to the given ECU, but the run of wire will typically be much shorter than that used in a common harness, since the majority of the wire run is achieved through the additive circuit added to the panel to which the probe is connected.

Holes that are not needed can be plugged, and locations where other holes may be needed can be provided with punchouts 107 so that the access point for a given circuit is known. The end of the panel 109 may provide a connection point for the engine room harness, where the various circuits can be connected to distribute signals or power as appropriate. One or more channels may also be used as ground channels, connected to the body of the vehicle. A lateral (crosswise) configuration may also be achieved, if a given panel or model would be better served by the alternative configuration.

FIG. 1. shows a third alternative configuration 121 where cross axial channeling is used, so that channels 103a run longitudinally and channels 103b run laterally. These channels can be isolated at intersection points, or connected or cross-connected as needed if a series of channels 103a and 103b is utilized to distribute a signal or power to certain sectors of the vehicle. Connection points can be predrilled as before, and may isolate certain channels as in 105a or may intersect both directions of channels 105b if those channels are optionally connectable through insertion of a jumper or probe that reaches both channels. Cross-connection of channels may be done in fabrication, or it may be achievable through connection of two isolated channels, which may be useful if a channel needs to be cross-connected to a certain point due to unavailability (disabled, blocked, otherwise used, damaged, etc.) of a channel previously serving that point. Power is often needed or desired throughout the vehicle, and this configuration allows for distribution of power in a logical manner at regular intervals, accessible where needed and shielded from access until needed.

Circuit probes may be water-sealed to prevent intrusion of small amounts of liquid though the probe holes 105, and as noted, previously used holes that are not used (e.g., if a probe is moved due to unavailability of a channel) can be plugged to prevent liquid and other material intrusion. Connection points can be provided at areas of low traffic or under fully or partially protected surfaces e.g. under plastic trim plates included in seats, or other installed features, and geometrically shaped probes can be used to reduce the likelihood of damaging an inserted probe. As long as the damage is limited to the probe, however, it still may be possible to replace the probe and/or wire with much less complication and expense than would be incurred replacing a wiring harness.

Figure 2:
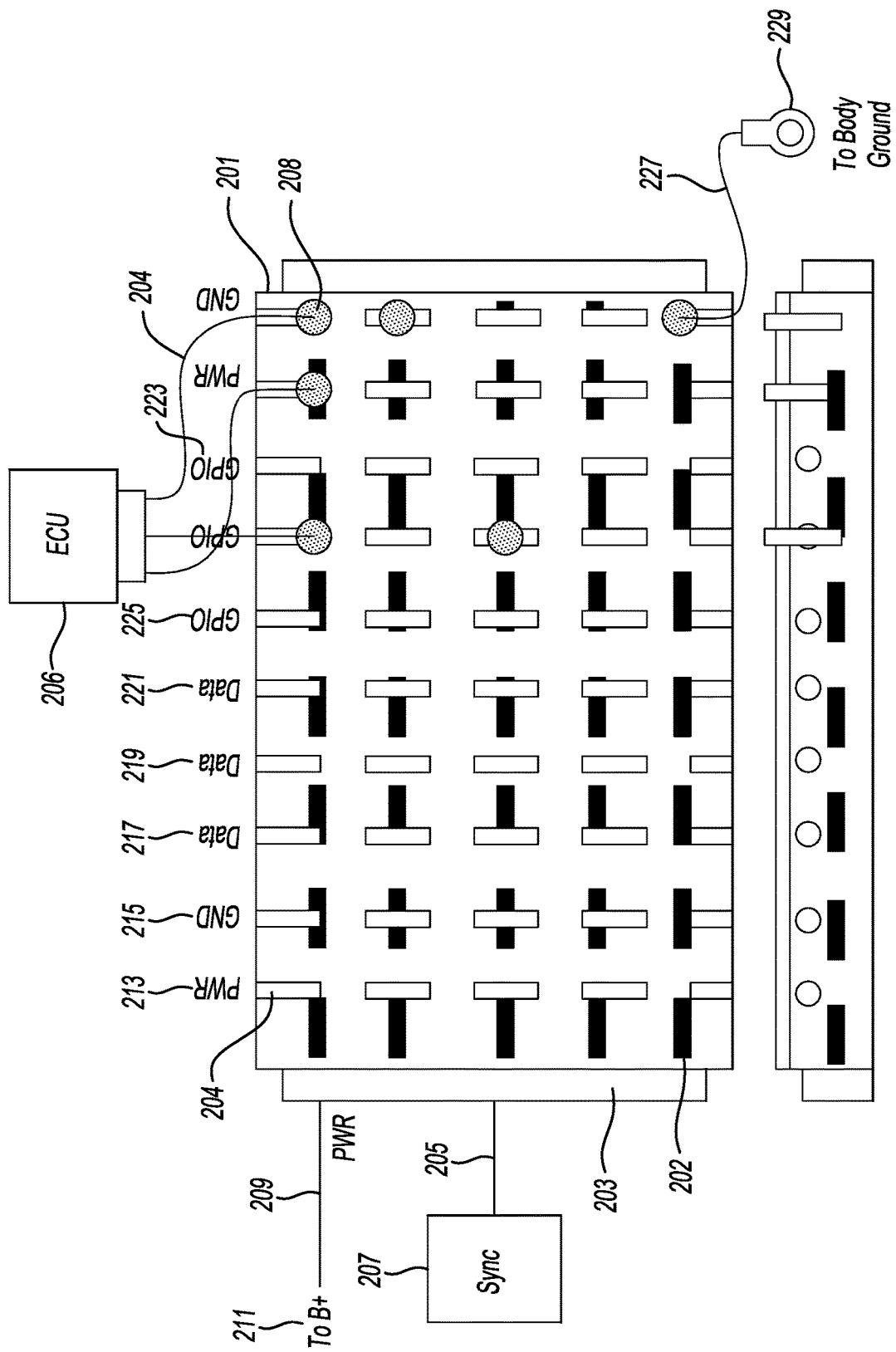
FIG. 2 shows another illustrative example of a cross-axial additive channeling system.

FIG. 2 shows another illustrative example of a cross-axial additive channeling system. In this example, panel 201 is provided with longitudinal 202 and lateral 204 channels. While channels are shown in limited numbers for illustrative purposes, it is appreciated that significantly more channels may actually be used as needed. The panel includes a connector 203 that can serve as the endpoints for the various panel channels 202, 204. Lateral channels 204 can be fed signals or power via connections to a corresponding longitudinal channel or may be otherwise connected to the connector 203. In the example where cross-connection is used to source the feeds to the lateral channels, as opposed to a more permanent connection to the connector 203, the channels can be repurposed as needed via connections to varied longitudinal channels, which may allow for more variance in configuration—i.e., the same panel layout can have different signal layouts as needed for a given model or model version, simply by cross-connecting a different configuration of signals to the lateral channels.

Further, ECUs 206 can be repositioned about the panel without changing vehicle wiring, simply by connecting the probes affixed to ECU wiring to the appropriate punchouts 208 serving the appropriate channels proximate to where the ECU is intended to be located. Thus, the same panel can be used for multiple vehicles through varied cross-connection and punchouts without having to devise a whole-vehicle wiring scheme for each.

Vehicle information and control signals 205 (general purpose input and output—GPIO) from one or more vehicle computers 207 can be sourced to the information carrying channels as appropriate. Channels can carry data 217, 219, GPIO 225, or power 213, or serve as ground connections 215. Grounded connections 215 can be cross-connected to a ground wire 227 channel grounded to the vehicle body 229. Data channels 217, 219 can be served with similar or different data based on feeds through the connector 203 and cross-connection as appropriate. GPIO signals from, for example, an infotainment hub 207 can also be served to certain channels via corresponding cross-connection from an origin channel connected to the infotainment system. Connections to an infotainment system, for example, could allow for control of an ECU 206 in the rear of the vehicle via touch controls on the infotainment system, since the two are now easily connected, without resorting to installation of physical buttons or switches for ECU control, if desired.

In this example, the ECU 206 is connected to a power channel, a GPIO channel and a ground channel, via a probe and wire 223 provided to each connection, allowing for short and efficient wiring runs that can easily be serviced and replaced if needed. The power channel 209 can be connected to the vehicle battery 211 to provide distributed power throughout the vehicle as needed, either through connection to that channel or a corresponding cross-connected channel. Cross-connection may be multi-hop, so that a single longitudinal channel (e.g. power) can provide both lateral (first cross-connection) and longitudinal (second cross-connection) channel power as desired.

Figure 3:
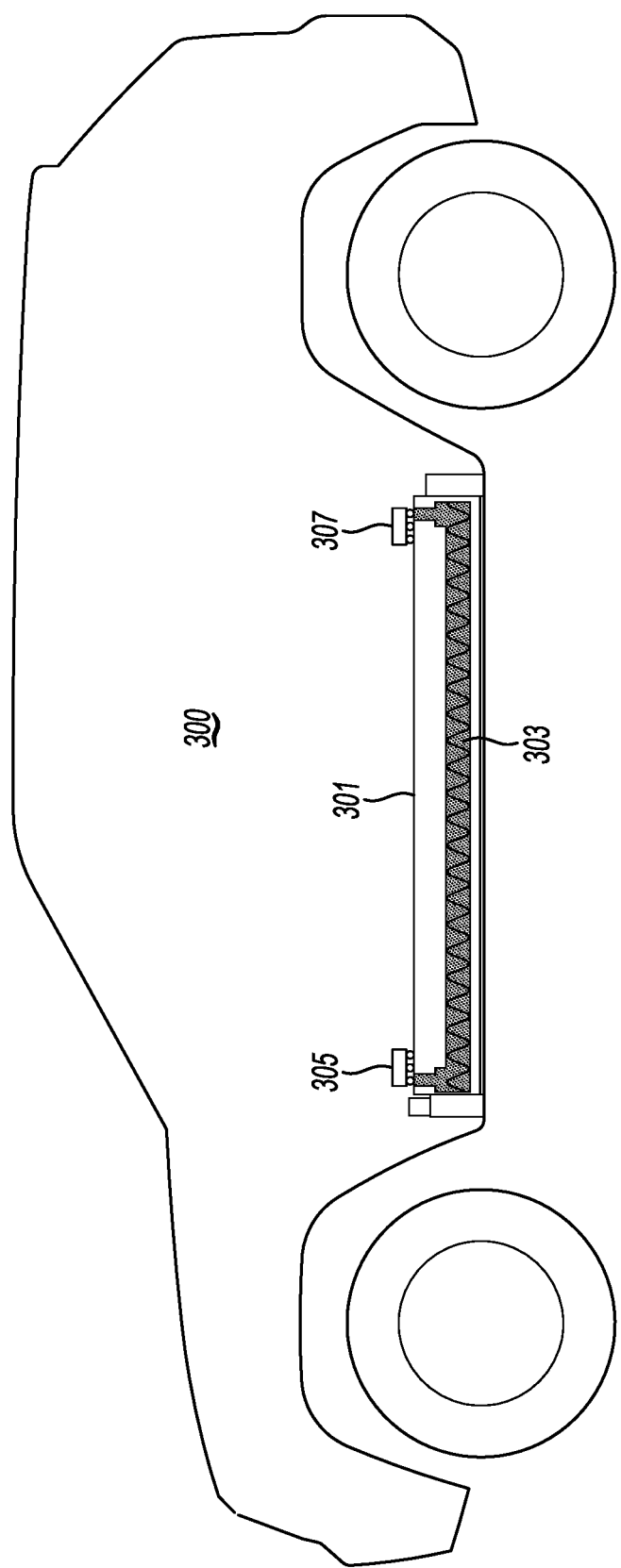
FIG. 3 shows an illustrative example of a subtractive solution.

FIG. 3 shows an illustrative example of a subtractive solution, wherein tunneling of hollow tubing, in lieu of wiring, can be provided to carry signals (e.g., sound) and to provide stability. Hollow channels can be used as waveguides for sound propagation or, at appropriate diameters, could be used as airflow HVAC lines to replace certain ductwork otherwise necessary. A waveguide includes a structure designed to guide a wave mechanical or electromagnetic in a specific direction for example from a transmitter (Tx) to a receiver (Rx). The structure can be constructed of metal or dielectric material with each providing its benefits. For example, metal cavities are more rigid and can be used for higher power applications providing lower energy loss. Waveguides can be constructed in different shapes (rectangular, circular, elliptical, etc.), with each shape providing different results. In one embodiment, the hollow cavities (metal or dielectric) in the base structure/frame can be used as electromagnetic waveguides. Since the size of the waveguide is determined by the wavelength of the directed wave, these hollow cavities can be designed around the carrier frequency of the intended application and vice versa.

The vehicle 300 shown in FIG. 3 include a floor panel 301 with a hollow channel 303 provided therein. The channel can include tubing of different materials inserted into holes drilled into a base material, and can carry airflow or can carry signals between two remotely situated systems 305, 307. Waveguides may be used, for example, for RF and/or sound applications. Ultrasonics and pressure sensors can be used for sending mechanical signals, such as signals to wireless speakers.

Hollow channels can serve as a mini-duct system, and even though they may not be as substantial in diameter as existing ductwork, volumetric flow rates of HVAC requirements can be used to determine the appropriate number of hollow channels for replacement. Cross sections of the various hollow channels are multiplied times the average airflow speed of each channel and added across multiple channels to accumulate the necessary volumetric flow rate. This system can lead to the elimination of certain ductwork and/or a reduction in size and materials utilized for other ductwork. The solution may further allow for better distribution of HVAC outflow or air-return, by having a variety of smaller nozzles deployable throughout the vehicle that have a net effect of distributing a comparable amount of air with a better distribution. The nozzles could also be controllable if desired, so that they could be opened to maximize distribution or closed to maximize outflow at an end-unit where a plurality of the tubes combined (similar to a conventional present output at the end of a larger duct).

When constructing a whole vehicle or a series of panels to be used in a vehicle, it is appreciated that signals can be passed between panels by cross-connecting from a first channel in a first panel to a first channel in a second panel. This allows for distribution of signals to virtually any point in the vehicle through panels and short-wired probes, with significantly less inclusion of wiring harnesses, if desired. For example, if a control for a rear light, deployed in the ceiling is desired, power and control signals can be cross-connected from a floor panel to a sidewall panel to a headliner panel with short cross-connections and provided to the light as needed through perforations in the headliner panel. Installation of an aftermarket LED color-changing light may require inclusion of an ECU at the location of the light, but this can easily be added by, for example, removing a punchout for an additional data channel or control channel and connecting the ECU to the corresponding channels. Thus, the vehicle can be retrofit with an advanced interior light with virtually no additional wiring required. Users wishing to outfit a whole vehicle with improved aftermarket lighting can do so by tapping into the corresponding locations in the floor or sidewall panels as needed, and can either control the whole system synchronously by connecting the lights to the same control channels or obtain separately controlled lighting by connecting the lights and ECUs (if provided) to different channels for controlling each.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle panel comprising:
   a plurality of channels, running within the panel;
   a first of the plurality of channels including a first wire capable of carrying at least one of power or a vehicle data signal;
   a second of the plurality of channels including a second wire capable of carrying at least one of power or a vehicle data signal;
   a connection point, provided to at least each of the first and second channels, the connection point connectable to at least one of a battery or a vehicle computing system, and wherein selection of connection between the vehicle computing system or battery to a given connection point provided to a given one of the first or second channels dictates whether the channel carries the vehicle data signal or power; and
   a plurality of holes provided through a common plane of the panel, at least two of the holes connecting to the first wire and at least two of the holes connecting to the second wire allowing a connection probe to be inserted into a respective hole to connect to a respective wire to which the respective hole connects.

2. The panel of claim 1, wherein at least one third channel includes hollow tubing to act as a waveguide for signals between a signal transmitter and signal receiver, both communicably connected to the hollow tubing.

3. The panel of claim 1, wherein at least one third channel includes hollow tubing connected at a first point to a vehicle heating, ventilation and air-conditioning system (HVAC) blower output and connected at a second point to a vehicle distribution vent for distribution of airflow generated by the blower output.

4. The panel of claim 3, wherein the second point includes a vent served singularly by the third channel.

5. The panel of claim 3, wherein the second point includes a vent served by the third channel and one or more fourth channels also including hollow tubing connected to the HVAC blower output.

6. The panel of claim 1, further comprising one or more perforated punch-outs in the common plane, demarking hole locations providing connection to at least one of the first or second channels upon removal of the punch-out.

7. The panel of claim 1, wherein at least one of the first of the plurality of channels runs along a longitudinal axis of the body panel and at least one of the second of the plurality of channels runs along a lateral axis of the panel substantially perpendicular to the longitudinal axis.

8. The panel of claim 7, wherein the at least one longitudinal channel and the at least the second lateral channel intersect directionally but remain physically separated by panel material.

9. The panel of claim 7, wherein a signal from the at least one longitudinal channel is provided along the length of the at least the second lateral channel via a wire connecting a longitudinal wire provided to the longitudinal channel to lateral wire provided to the lateral channel.

10. The panel of claim 1, wherein the panel includes a liner, trim, a body panel or structural panel.

11. A vehicle panel comprising:
    a plurality of channels, running within the panel;
    a first of the plurality of channels including a first wire capable of carrying at least one of power or a vehicle data signal;
    a second of the plurality of channels including a second wire capable of carrying at least one of power or a vehicle data signal;
    a third of the plurality of channels including hollow tubing connected at a first point to a vehicle heating, ventilation and air-conditioning system (HVAC) blower output and connected at a second point to a vehicle distribution vent for distribution of airflow generated by the blower output;
    a connection point, provided to at least each of the first and second channels, the connection point connectable to at least one of a battery or a vehicle computing system, and wherein selection of connection between the vehicle computing system or battery to a given connection point provided to a given one of the first or second channels dictates whether the channel carries the vehicle data signal or power; and a plurality of holes provided through a common plane of the panel, at least two of the holes connecting to the first wire and at least two of the holes connecting to the second wire allowing a connection probe to be inserted into a respective hole to connect to a respective wire to which the respective hole connects.

12. The panel of claim 11, wherein the second point includes a vent served singularly by the third channel.

13. The panel of claim 11, wherein the second point includes a vent served by the third channel and one or more fourth channels also including hollow tubing connected to the HVAC blower output.

* * * * *